US012347367B1

(12) United States Patent
Lin

(10) Patent No.: US 12,347,367 B1
(45) Date of Patent: Jul. 1, 2025

(54) PIXEL CIRCUIT

(71) Applicant: AUO Corporation, Hsinchu (TW)

(72) Inventor: Wei-Li Lin, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/884,121

(22) Filed: Sep. 13, 2024

(30) Foreign Application Priority Data

Mar. 4, 2024 (TW) ................................ 113107760

(51) Int. Cl.
*G09G 3/32* (2016.01)

(52) U.S. Cl.
CPC ......... *G09G 3/32* (2013.01); *G09G 2310/061* (2013.01); *G09G 2310/08* (2013.01)

(58) Field of Classification Search
None
See application file for complete search history.

(56) References Cited

U.S. PATENT DOCUMENTS 11,640,785 B1 5/2023 Wu et al.
2022/0051627 A1* 2/2022 Yang .................... G09G 3/3233

FOREIGN PATENT DOCUMENTS

TW I703547 9/2020
TW I801080 5/2023

* cited by examiner

*Primary Examiner* — Christopher J Kohlman
(74) *Attorney, Agent, or Firm* — JCIPRNET

(57) ABSTRACT

A pixel circuit is provided. The pixel circuit includes: a light-emitting element, a driving circuit, a capacitor, a first compensation circuit, a second compensation circuit, a reset read circuit, a data writing circuit, and a light-emitting control circuit. The light-emitting element has a cathode that receives a system low voltage. The driving circuit provides a driving current based on a gate voltage. The capacitor is coupled between a gate control node and a control node. The first compensation circuit provides a system high voltage to the control node and the driving circuit. The second compensation circuit provides a reference voltage to the driving circuit. The reset read circuit provides an initial voltage to the control node and the gate control node. The data writing circuit provides a data signal to the gate control node. The light-emitting control circuit provides the driving current to the light-emitting element.

12 Claims, 5 Drawing Sheets

PIXEL CIRCUIT

CROSS-REFERENCE TO RELATED APPLICATION

This application claims the priority benefit of Taiwan application serial no. 113107760, filed on Mar. 4, 2024. The entirety of the above-mentioned patent application is hereby incorporated by reference herein and made a part of this specification.

BACKGROUND

Technical Field

The disclosure relates to a pixel circuit, and particularly relates to a self-luminous pixel circuit.

Description of Related Art

As the resolution of display panels increases, the density of pixels disposed on the panels increases, and the area occupied by a single pixel circuit must become increasingly smaller. In conventional self-luminous pixel circuits, each pixel circuit includes a light-emitting element and a driving transistor. When the driving transistor configured to stabilize the driving current performs voltage compensation, the pixel circuit must be disposed with a plurality of capacitors and a plurality of transistors for voltage compensation. However, providing the plurality of capacitors will increase the circuit area of the pixel circuit. How to perform voltage compensation on the driving transistor while reducing the circuit area of the pixel circuit is a major issue in circuit design for those skilled in the art.

SUMMARY

The disclosure provides a pixel circuit which is a circuit that uses a single capacitor to have a smaller circuit area.

The pixel circuit of the disclosure includes a light-emitting element, a driving circuit, a capacitor, a first compensation circuit, a second compensation circuit, a reset read circuit, a data writing circuit, and a light-emitting control circuit. The light-emitting element has an anode and a cathode that receives a system low voltage. The driving circuit receives a gate voltage of a gate control node to provide a driving current based on the gate voltage. The capacitor is coupled between the gate control node and a control node. The first compensation circuit receives a system high voltage and a light-emitting signal and is coupled to the control node and the driving circuit to provide the system high voltage to the control node and the driving circuit based on the light-emitting signal. The second compensation circuit receives a reference voltage and a compensation signal and is coupled to the driving circuit to provide the reference voltage to the driving circuit based on the compensation signal. The reset read circuit receives an initial voltage and is coupled to the control node and the gate control node to receive a reset signal, and provides the initial voltage to the control node and the gate control node based on the reset signal. The data writing circuit receives a data signal and a writing signal, and is coupled to the gate control node to provide the data signal to the gate control node based on the writing signal. The light-emitting control circuit is coupled between the driving circuit and the anode of the light-emitting element, and receives the light-emitting signal to transmit the driving current to the anode of the light-emitting element based on the light-emitting signal.

Based on the above, in the pixel circuit of the embodiment of the disclosure, since the pixel circuit is a circuit that uses a single capacitor, the circuit area used by the pixel circuit with only a single capacitor may be reduced.

In order to make the above-mentioned features and advantages of the disclosure clearer and easier to understand, the following embodiments are given and described in details with accompanying drawings as follows.

DESCRIPTION OF THE EMBODIMENTS

Unless otherwise defined, all terminologies (including technical and scientific terminologies) used herein have the same meaning as commonly understood by people having ordinary skill in the art to which the disclosure belongs. It is understood that these terminologies, such as those defined in commonly used dictionaries, should be interpreted as having meanings consistent with the relevant art and the background or context of the disclosure, and should not be interpreted in an idealized or overly formal way, unless otherwise defined in the embodiments of the disclosure.

It should be understood that, although the terminologies “first,” “second,” “third,” and so forth may serve to describe various elements, components, regions, layers, and/or sections in this disclosure, these elements, components, regions, layers, and/or sections shall not be limited by these terminologies. These terminologies merely serve to distinguish one element, component, region, layer, and/or section from another element, component, region, layer, or section. Thus, a first “element,” “component,” “region,” “layer,” or “section” discussed below may be called as a second element, component, region, layer, or section without departing from the teachings herein.

The terminologies used herein are only for the purpose of describing particular embodiments and are not restrictive. As used herein, the singular forms “a,” “an,” and “the” are intended to include the plural forms including “at least one” or represent “and/or” unless the content clearly indicates otherwise. As used herein, the terminology “and/or” includes any and all combinations of one or more of the associated listed items. It should also be understood that when used in this disclosure, the terminologies “include” and/or “comprise” indicate the presence of the described features, regions, overall scenarios, steps, operations, elements, and/or components but do not exclude the presence or addition of one or more other features, regions, overall scenarios, steps, operations, elements, components, and/or combinations thereof.

Figure 1:
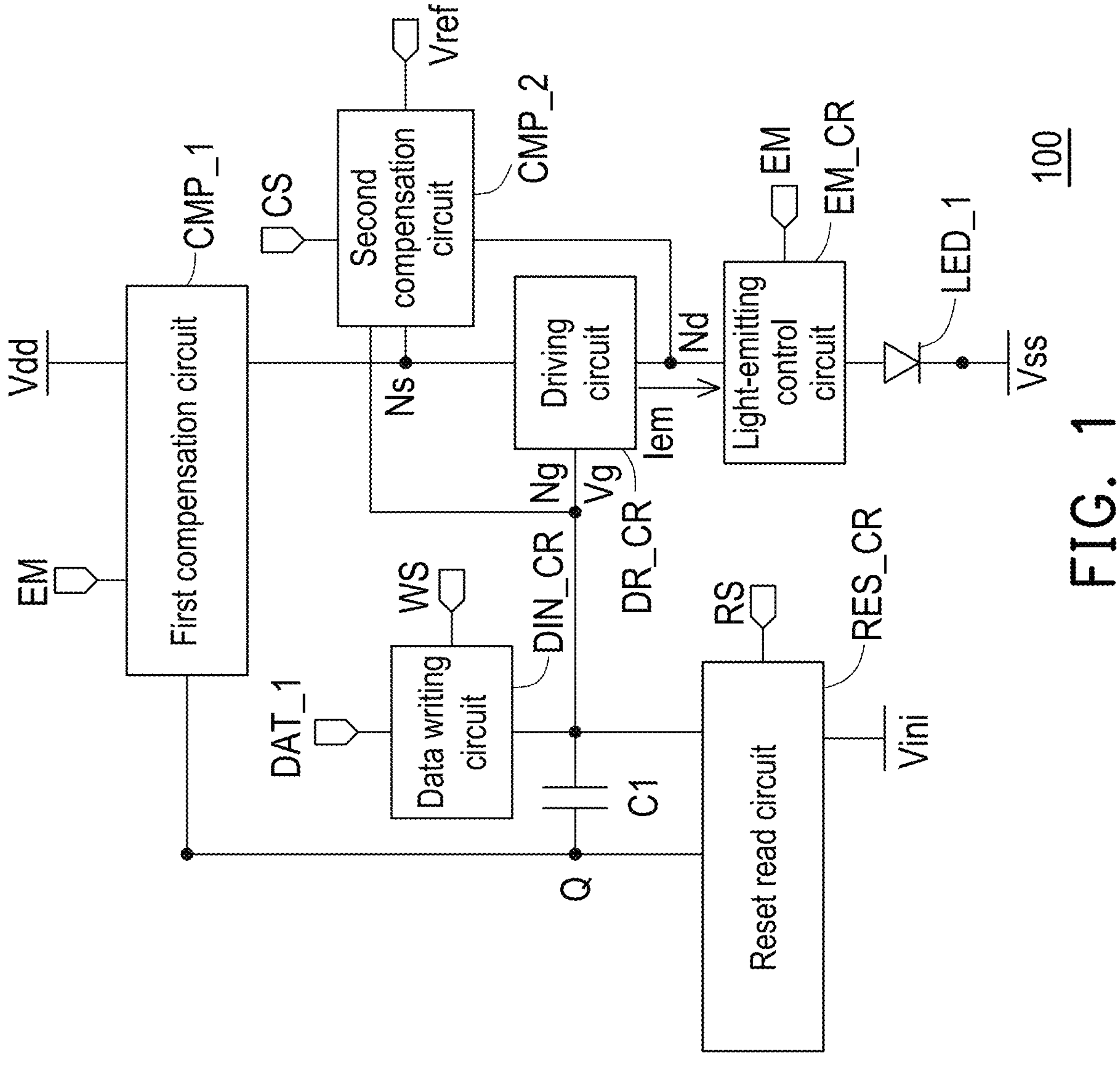
FIG. 1 is a schematic circuit diagram of a pixel circuit according to an embodiment of the disclosure.

FIG. 1 is a schematic circuit diagram of a pixel circuit according to an embodiment of the disclosure. Referring to FIG. 1, in the embodiment, a pixel circuit 100 includes a light-emitting element (taking a micro light-emitting diode LED_1 as an example), a driving circuit DR_CR, a capacitor C1, a first compensation circuit CMP_1, a second compensation circuit CMP_2, a reset read circuit RES_CR, a data writing circuit DIN_CR and a light-emitting control circuit EM_CR. The driving circuit DR_CR has an upper node Ns, a gate control node Ng, and a lower node Nd.

The micro light-emitting diode LED_1 has an anode and a cathode that receives a system low voltage Vss. The light-emitting control circuit EM_CR is coupled between the anode of the micro light-emitting diode LED_1 and the driving circuit DR_CR, and receives a light-emitting signal EM to transmit a driving current Iem provided by the driving circuit DR_CR to the anode of the micro light-emitting diode LED_1 based on the light-emitting signal EM. The driving circuit DR_CR receives a gate voltage Vg on the gate control node Ng to provide the driving current Iem based on the gate voltage Vg, and delivers the driving current Iem to the light-emitting control circuit EM_CR via the lower node Nd.

In the embodiment, the first compensation circuit CMP_1 receives a system high voltage Vdd and the light-emitting signal EM. The first compensation circuit CMP_1 is coupled to a control node Q and coupled to the upper node Ns of the driving circuit DR_CR. The first compensation circuit CMP_1 may provide the system high voltage Vdd to the control node Q and the driving circuit DR_CR based on the light-emitting signal EM. The second compensation circuit CMP_2 receives a reference voltage Vref and a compensation signal CS, and is coupled to the upper node Ns, the gate control node Ng, and the lower node Nd of the driving circuit DR_CR. The second compensation circuit CMP_2 may provide the reference voltage Vref to the upper node Ns of the driving circuit DR_CR based on the compensation signal CS, and may turn on the gate control node Ng and the lower node Nd of the driving circuit DR_CR based on the compensation signal CS.

The capacitor C1 is coupled between the gate control node Ng and the control node Q. The reset read circuit RES_CR receives an initial voltage Vini and a reset signal RS, and is coupled to the control node Q and the gate control node Ng. The reset read circuit RES_CR may provide the initial voltage Vini to the control node Q and the gate control node Ng based on the reset signal RS. The data writing circuit DIN_CR receives a data signal DAT_1 and a writing signal WS, and is coupled to the gate control node Ng. The data writing circuit DIN_CR may provide the data signal DAT_1 to the gate control node Ng according to the writing signal WS.

Based on the above, the pixel circuit 100 uses a single capacitor (that is, the capacitor C1). Since the capacitor is the main factor occupying the circuit area in the circuit, the circuit area used by the pixel circuit 100 with only a single capacitor may be reduced. Moreover, by providing the system high voltage Vdd to the control node Q, the influence of the system high voltage Vdd on the driving current Iem may be suppressed (that is, the system high voltage Vdd is compensated).

Figure 2:
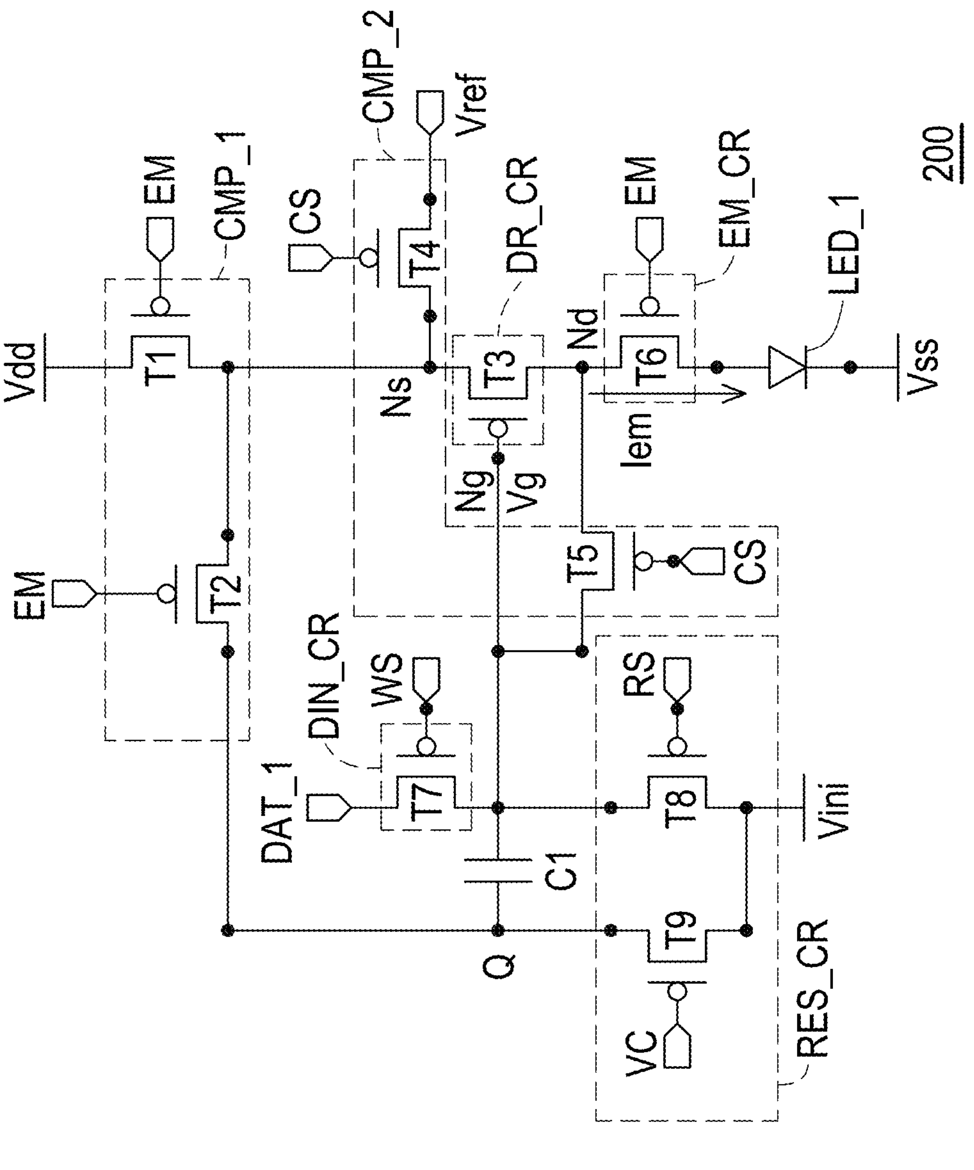
FIG. 2 is a detailed schematic circuit diagram of a pixel circuit according to an embodiment of the disclosure.

FIG. 2 is a detailed schematic circuit diagram of a pixel circuit according to an embodiment of the disclosure. Referring to FIG. 1 and FIG. 2, the component configuration of a pixel circuit 200 may be described with reference to the pixel circuit 100, and the pixel circuit 200 may be regarded as an implementation example of the pixel circuit 100.

In the embodiment, the first compensation circuit CMP_1 includes transistors T1 and T2 (corresponding to a first transistor and a second transistor). The transistor T1 has a first terminal that receives the system high voltage Vdd, a control terminal that receives the light-emitting signal EM, and a second terminal coupled to the upper node Ns. The transistor T2 has a first terminal coupled to the control node Q, a control terminal that receives the light-emitting signal EM, and a second terminal coupled to the second terminal of the transistor T1. The driving circuit DR_CR includes a transistor T3 (corresponding to a third transistor). The transistor T3 has a first terminal coupled to the second terminal of the transistor T1 via the upper node Ns, a control terminal coupled to the gate control node Ng, and a second terminal that provides the driving current Iem to the light-emitting control circuit EM_CR via the lower node Nd.

In the embodiment, the second compensation circuit CMP_2 includes a transistor T4 and a transistor T5 (corresponding to a fourth transistor and a fifth transistor). The transistor T4 has a first terminal coupled to the upper node Ns, a control terminal that receives the compensation signal CS, and a second terminal that receives the reference voltage Vref. The transistor T5 has a first terminal coupled to the gate control node Ng, a control terminal that receives the compensation signal CS, and a second terminal coupled to the lower node Nd. The light-emitting control circuit EM_CR includes a transistor T6 (corresponding to a sixth transistor). The transistor T6 has a first terminal coupled to the lower node Nd, a control terminal that receives the light-emitting signal EM, and a second terminal coupled to the anode of the micro light-emitting diode LED_1.

In the embodiment, the data writing circuit DIN_CR includes a transistor T7 (corresponding to a seventh transistor). The transistor T7 has a first terminal that receives the data signal DAT_1, a control terminal that receives the writing signal WS, and a second terminal coupled to the gate control node Ng. The reset read circuit RES_CR includes a transistor T8 and a transistor T9 (corresponding to an eighth transistor and a ninth transistor). The transistor T8 has a first terminal coupled to the gate control node Ng, a control terminal that receives the reset signal RS, and a second terminal that receives the initial voltage Vini. The transistor T9 has a first terminal coupled to the control node Q, a control terminal that receives a control signal VC, and a second terminal that receives the initial voltage Vini.

In the embodiment, the transistors T1 to T9 are P-type transistors as examples, but the embodiment of the disclosure is not limited thereto.

Figure 3:
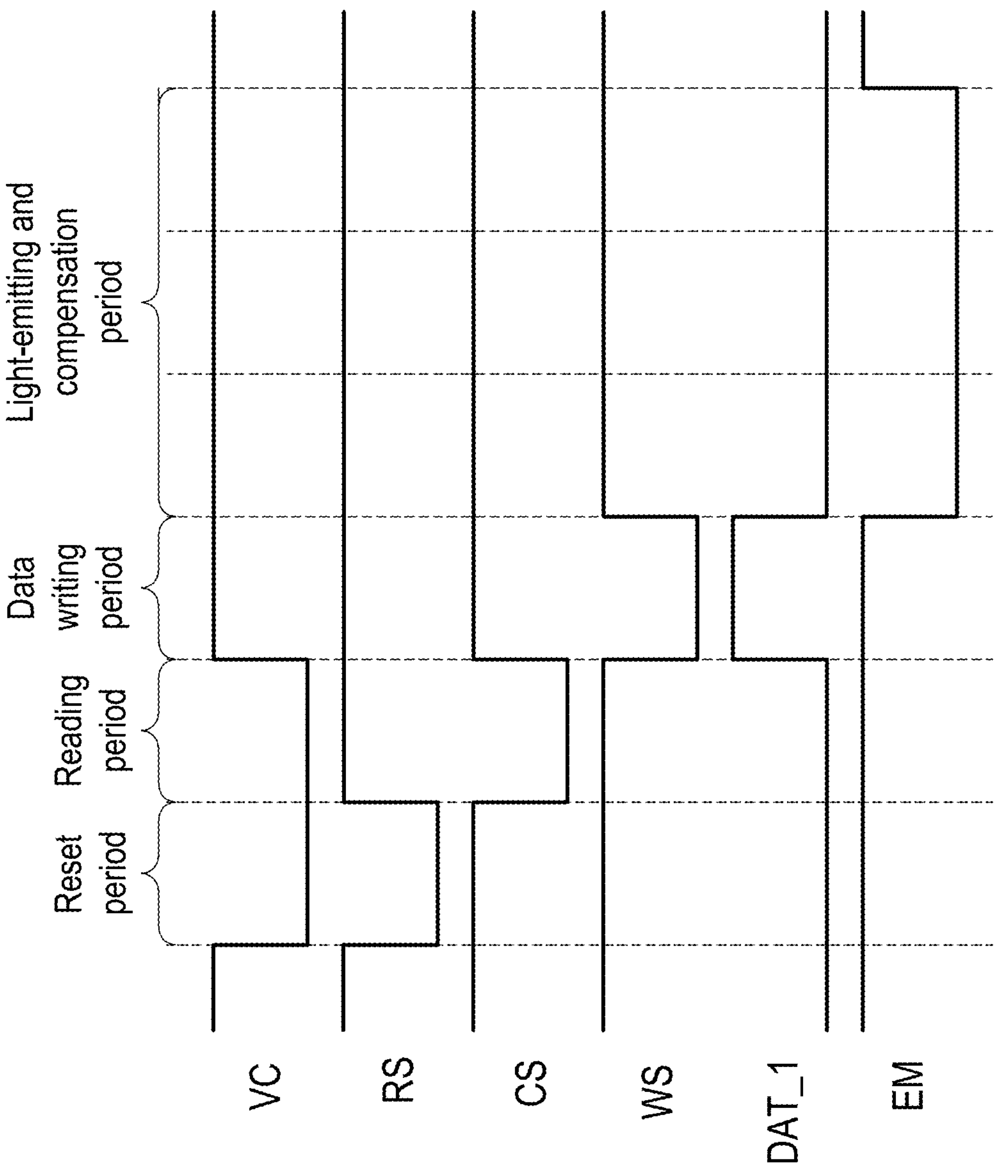
FIG. 3 is a timing diagram of a signal timing according to an embodiment of the disclosure.

FIG. 3 is a timing diagram of a signal timing according to an embodiment of the disclosure. Referring to FIG. 2 and FIG. 3, in the embodiment, the driving periods that the pixel circuit (such as 100 and 200) may have in a single frame period are roughly divided, in sequence, into a reset period, a reading period, a data writing period, a light-emitting and compensation period. The reset signal RS, the compensation signal CS, the writing signal WS, and the light-emitting signal EM may be sequentially enabled in different periods (for example, at a low voltage level), that is, the reset signal RS is enabled during the reset period, the compensation signal CS is enabled during the reading period, the writing signal WS is enabled during the data writing period, and the light-emitting signal EM is enabled during the light-emitting and compensation period. Moreover, in the embodiment, the enabling period of the control signal VC overlaps the enabling periods of the reset signal RS and the compensation signal CS, that is, the time length of the enabling period of the control signal VC is equal to the sum of the time lengths of the enabling periods of the reset signal RS and the compensation signal CS.

During the reset period, the control signal VC and the reset signal RS are enabled, and the compensation signal CS, the writing signal WS, and the light-emitting signal EM are disabled (for example, at a high voltage level). At this time, the transistor T3, the transistor T8, and the transistor T9 in the pixel circuit 200 are turned on, and the other transistors are turned off (or cut off). Since the transistor T8 and the transistor T9 are turned on, the initial voltage Vini is provided to the control node Q and the gate control node Ng, so the voltages of the control node Q and the gate control node Ng will be equal to the initial voltage Vini, and after executing a complete driving period, the voltage level of the upper node Ns is approximately the system high voltage Vdd. However, in order to enable the transistor T3 to be turned on under the influence of the gate voltage Vg, that is, the initial voltage Vini may be set to a lower level (for example, a level between the system high voltage Vdd and the system low voltage Vss).

During the reading period, the control signal VC and the compensation signal CS are enabled, and the reset signal RS, the writing signal WS, and the light-emitting signal EM are disabled. The transistor T3, the transistor T4, the transistor T5, and the transistor T9 of the pixel circuit 200 are turned on, and the other transistors are turned off. At this time, the voltage of the control node Q is maintained at the initial voltage Vini. Since the transistor T4 and the transistor T5 are turned on, the voltage of the upper node Ns will be approximately equal to the reference voltage Vref, such that the gate voltage Vg of the gate control node Ng is approximately equal to the reference voltage Vref minus the critical voltage of the transistor T3, whereby the critical voltage of the transistor T3 may be stored through the capacitor C1. Based on the above, in the embodiment, the critical voltage of the transistor T3 may be read during the reading period and stored in the capacitor C1.

During the data writing period, the writing signal WS is enabled, and the control signal VC, the reset signal RS, the writing signal WS, and the light-emitting signal EM are disabled. The transistor T3 and the transistor T7 of the pixel circuit 200 are turned on, and the other transistors are turned off. The data writing circuit DIN_CR provides the data signal DAT_1 to the gate control node Ng (that is, performs data writing), so that the gate voltage Vg of the gate control node Ng becomes the data voltage transmitted by the data signal DAT_1. At this time, the voltage of the control node Q is as described in the following formula (1).

$$Q=\mathrm{Vini}+A\times[DAT\_1-(\mathrm{Vref}-|V_{TH}|)] \quad \text{formula (1)}$$

In formula (1), Q is the voltage value of control node Q, Vini is the voltage value of the initial voltage Vini, DAT_1 is the voltage value of the data signal DAT_1 during the data writing period, Vref is the voltage value of the reference voltage Vref, $V_{TH}$ is the critical voltage of the transistor T3, and A is the capacitance coefficient. The calculation method of A is as described in formula (2).

$$A=C1/(C1+C_{TFT1}) \quad \text{formula (2)}$$

In formula (2), C1 is the capacitance value of the capacitor C1, and during the data writing period, the gate control node Ng has a voltage change and is coupled to the control node Q through the capacitor C1. Therefore, $C_{TFT1}$ considers the equivalent capacitance of the transistor coupled to the control node Q, that is, $C_{TFT1}$ will be the sum of the off-capacitance values of the transistor T2 and the transistor T9. In addition, since the capacitance value of the capacitor C1 is usually much larger than the off-capacitance values of the transistor T2 and the transistor T9, the capacitance coefficient A is approximately equal to 1.

During the light-emitting and compensation period, the light-emitting signal EM is enabled, and the writing signal WS, the control signal VC, the reset signal RS, and the writing signal WS are disabled. The transistor T1, the transistor T2, the transistor T3, and the transistor T6 of the pixel circuit 200 are turned on, and the other transistors are turned off. Since the transistors T1 and T2 are turned on, the voltage of the control node Q is equal to the system high voltage Vdd. The voltage of the gate control node Ng is equal to the voltage of the gate control node Ng during the data writing period plus the voltage of the control node Q during the light-emitting and compensation period minus the voltage of the control node Q during the data writing period. The gate voltage Vg of the gate control node Ng is as described in the following formula (3).

$$Vg=DAT\_1+B\times\{Vdd-\mathrm{Vini}-A\times[DAT\_1-(\mathrm{Vref}-|V_{TH}|)]\} \quad \text{formula (3)}$$

In formula (3), DAT_1 is the voltage value of data signal DAT_1 during the data writing period, Vdd is the voltage value of the system high voltage Vdd, Vini is the voltage value of the initial voltage Vini, Vref is the voltage value of the reference voltage Vref, $V_{TH}$ is the critical voltage of the transistor T3, and A and B are both capacitance coefficients. A is the capacitance coefficient described in formula (2), and the calculation method of B is as described in formula (4).

$$B=C1/(C1+C_{TFT2}) \quad \text{formula (4)}$$

In formula (4), C1 is the capacitance value of the capacitor C1. Furthermore, during the light-emitting and compensation period, the control node Q has a voltage change and is coupled to the gate control node Ng through the capacitor C1. Therefore, $C_{TFT2}$ considers the equivalent capacitance of the transistor coupled to the gate control node Ng, that is, $C_{TFT2}$ will be the sum of the on-capacitance value of the transistor T3 and the off-capacitance values of the transistor T5, the transistor T7, and the transistor T8. In addition, since the capacitance value of the capacitor C1 is usually much larger than the on-capacitance value of the transistor T3 and the off-capacitance values of the transistor T5, the transistor T7, and the transistor T8, the capacitance coefficient B is approximately equal to 1.

During the light-emitting and compensation period, the turn-on conditions of the transistor T3 of the driving circuit DR_CR is as described in formula (5).

$$Vgs-V_{TH}=(1-AB)\times DAT\_1-B\times\mathrm{Vini}+AB\times\mathrm{Vref} \quad \text{formula (5)}$$

In formula (5), Vgs is the voltage difference between the gate and the source of the transistor T3, $V_{TH}$ is the critical voltage of the transistor T3, A is the capacitance coefficient described in formula (2), B is the capacitance coefficient described in formula (4), DAT_1 is the voltage value of the data signal DAT_1 during the data writing period, Vini is the voltage value of the initial voltage Vini, and Vref is the voltage value of the reference voltage Vref.

It may be seen from formula (5) that the turn-on voltage of the transistor T3 does not include the system high voltage Vdd and the critical voltage of the transistor T3. That is, the turn-on of the transistor T3 is not affected by the system high voltage Vdd and the critical voltage of the transistor T3. Therefore, the pixel circuit (such as 100 and 200) may compensate the system high voltage Vdd and the critical voltage of the transistor T3 through the operation of the first compensation circuit CMP_1 and the second compensation circuit CMP_2.

Figure 4:
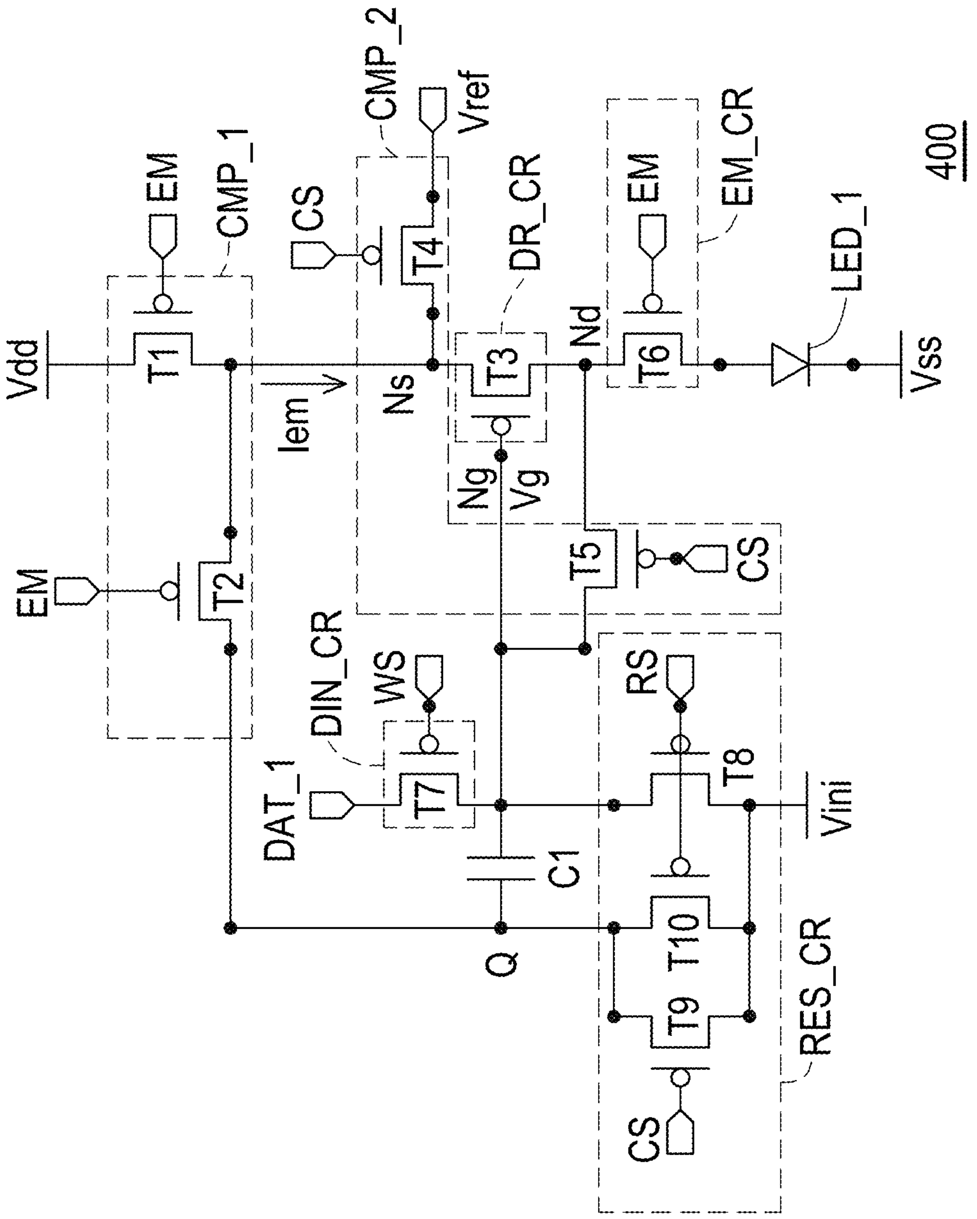
FIG. 4 is a detailed schematic circuit diagram of a pixel circuit according to an embodiment of the disclosure.

FIG. 4 is a detailed schematic circuit diagram of a pixel circuit according to an embodiment of the disclosure. Referring to FIG. 2 and FIG. 4, a pixel circuit 400 is substantially the same as the pixel circuit 200. The difference lies in the reset read circuit RES_CR, where the same or similar components are denoted by the same or similar reference numerals. In the pixel circuit 400, the reset read circuit RES_CR includes the transistor T8, the transistor T9, and a transistor T10 (corresponding to the eighth transistor to a tenth transistor). In the embodiment, the transistors T1 to T10 are P-type transistors, but the embodiment of the disclosure is not limited thereto.

In FIG. 4, the transistor T8 has the first terminal coupled to the gate control node Ng, the control terminal that receives the reset signal RS, and the second terminal that receives the initial voltage Vini. The transistor T9 has the first terminal coupled to the control node Q, the control terminal that receives the compensation signal CS, and the second terminal that receives the initial voltage Vini. The transistor T10 has a first terminal coupled to the control node Q, a control terminal that receives the reset signal RS, and a second terminal that receives the initial voltage Vini. According to the above, the pixel circuit 400 does not receive the control signal VC, so the pixel circuit 400 may omit the configuration of a signal line.

Figure 5:
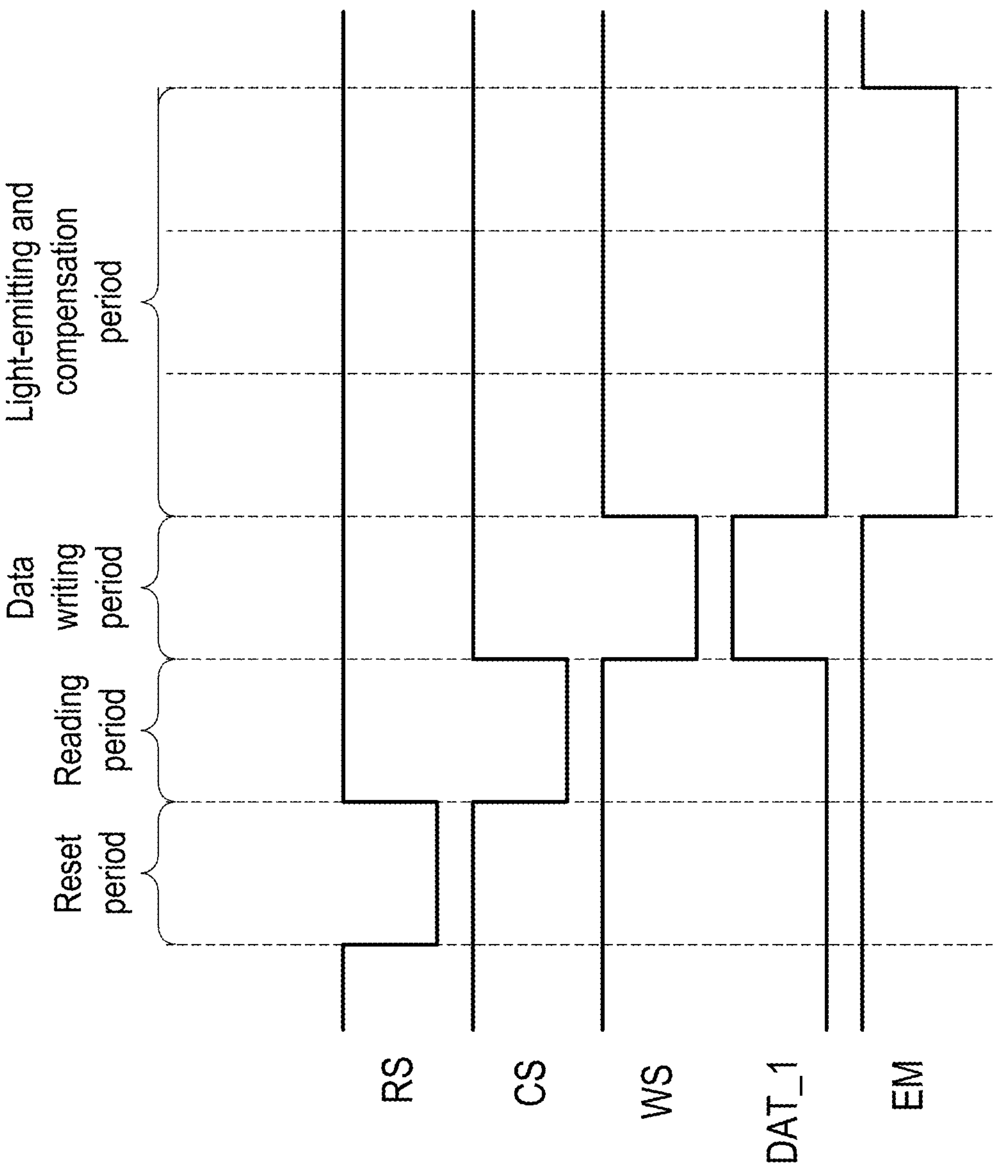
FIG. 5 is a timing diagram of a signal timing according to an embodiment of the disclosure.

Compared with the timing diagram shown in FIG. 3, the control signal VC is omitted in FIG. 5. Moreover, the timing diagram of the reset signal RS, the compensation signal CS, the writing signal WS, and the light-emitting signal EM in FIG. 5 is exactly the same as the timing diagram in FIG. 3. That is, for the operation of the pixel circuit 400, reference may be made to the embodiment shown in FIG. 3, and will not be repeated here. Furthermore, the function of the transistor T9 of the pixel circuit 200 is split and implemented by the transistors T9 and T10 of the pixel circuit 400.

In summary, in the pixel circuit of the embodiment of the disclosure, since the pixel circuit is a circuit that uses a single capacitor, the circuit area used by the pixel circuit with only a single capacitor may be reduced.

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. A pixel circuit, comprising:

a light-emitting element, having an anode and a cathode that receives a system low voltage;

a driving circuit, configured to receive a gate voltage of a gate control node to provide a driving current based on the gate voltage;

a capacitor, coupled between the gate control node and a control node;

a first compensation circuit, configured to receive a system high voltage and a light-emitting signal, and coupled to the control node and the driving circuit to provide the system high voltage to the control node and the driving circuit based on the light-emitting signal;

a second compensation circuit, configured to receive a reference voltage and a compensation signal, and coupled to the driving circuit to provide the reference voltage to the driving circuit based on the compensation signal;

a reset read circuit, configured to receive an initial voltage, and coupled to the control node and the gate control node to receive a reset signal, and provide the initial voltage to the control node and the gate control node based on the reset signal;

a data writing circuit, configured to receive a data signal and a writing signal, and coupled to the gate control node to provide the data signal to the gate control node based on the writing signal; and a light-emitting control circuit, coupled between the driving circuit and the anode of the light-emitting element, and configured to receive the light-emitting signal to transmit the driving current to the anode of the light-emitting element based on the light-emitting signal.

2. The pixel circuit according to claim 1, wherein the first compensation circuit comprises:

a first transistor, having a first terminal that receives the system high voltage, a control terminal that receives the light-emitting signal, and a second terminal coupled to the driving circuit to provide the system high voltage; and a second transistor, having a first terminal coupled to the control node, a control terminal that receives the light-emitting signal, and a second terminal coupled to the second terminal of the first transistor.

3. The pixel circuit according to claim 2, wherein the driving circuit comprises:

a third transistor, having a first terminal coupled to the second terminal of the first transistor, a control terminal coupled to the gate control node, and a second terminal that provides the driving current.

4. The pixel circuit according to claim 3, wherein the second compensation circuit comprises:

a fourth transistor, having a first terminal coupled to the first terminal of the third transistor, a control terminal that receives the compensation signal, and a second terminal that receives the reference voltage; and a fifth transistor, having a first terminal coupled to the gate control node, a control terminal that receives the compensation signal, and a second terminal coupled to the second terminal of the third transistor.

5. The pixel circuit according to claim 4, wherein the light-emitting control circuit comprises:

a sixth transistor, having a first terminal coupled to the second terminal of the third transistor, a control terminal that receives the light-emitting signal, and a second terminal coupled to the anode of the light-emitting element.

6. The pixel circuit according to claim 5, wherein the data writing circuit comprises:

a seventh transistor, having a first terminal that receives the data signal, a control terminal that receives the writing signal, and a second terminal coupled to the gate control node.

7. The pixel circuit according to claim 6, wherein the reset read circuit comprises:

an eighth transistor, having a first terminal coupled to the gate control node, a control terminal that receives the reset signal, and a second terminal that receives the initial voltage; and a ninth transistor, having a first terminal coupled to the control node, a control terminal that receives a control signal or the compensation signal, and a second terminal that receives the initial voltage.

8. The pixel circuit according to claim 7, wherein the reset read circuit further comprises:

a tenth transistor, having a first terminal coupled to the control node, a control terminal that receives the reset signal, and a second terminal that receives the initial voltage, wherein the control terminal of the ninth transistor receives the compensation signal.

9. The pixel circuit according to claim 8, wherein the first transistor, the second transistor, the third transistor, the fourth transistor, the fifth transistor, the sixth transistor, the seventh transistor, the eighth transistor, the ninth transistor, and the tenth transistor are P-type transistors.

10. The pixel circuit according to claim 7, wherein an enabling period of the control signal overlaps a sum of enabling periods of the reset signal and the compensation signal.

11. The pixel circuit according to claim 1, wherein the reset signal, the compensation signal, and the writing signal are sequentially enabled in different periods.

12. The pixel circuit according to claim 1, wherein the light-emitting element comprises a micro light-emitting diode.

* * * * *